US012545855B2

(12) United States Patent
Nevermann et al.

(10) Patent No.: US 12,545,855 B2
(45) Date of Patent: Feb. 10, 2026

(54) LIQUID ACIDIC CLEANING AGENT COMPOSITIONS FOR HARD SURFACES

(71) Applicant: MENNO CHEMIE-VERTRIEB GMBH, Norderstedt (DE)

(72) Inventors: Jan Nevermann, Hamburg (DE); Wolfgang Zerling, Kaltenkirchen (DE)

(73) Assignee: MENNO CHEMIE-VERTRIEB GMBH, Norderstedt (DE)

( * ) Notice: Subject to any disclaimer, the term of this patent is extended or adjusted under 35 U.S.C. 154(b) by 876 days.

(21) Appl. No.: 17/762,385

(22) PCT Filed: Sep. 2, 2020

(86) PCT No.: PCT/EP2020/074431

§ 371 (c)(1),
(2) Date: Mar. 22, 2022

(87) PCT Pub. No.: WO2021/063619

PCT Pub. Date: Apr. 8, 2021

(65) Prior Publication Data

US 2022/0340839 A1 Oct. 27, 2022

(30) Foreign Application Priority Data

Oct. 1, 2019 (EP) .................................... 19200807

(51) Int. Cl.

| | |
|---|---|
| ***C11D 1/12*** | (2006.01) |
| ***C11D 1/14*** | (2006.01) |
| ***C11D 1/72*** | (2006.01) |
| ***C11D 1/83*** | (2006.01) |
| ***C11D 3/00*** | (2006.01) |
| ***C11D 3/20*** | (2006.01) |
| ***C11D 3/28*** | (2006.01) |
| ***C11D 3/30*** | (2006.01) |
| ***C11D 3/32*** | (2006.01) |
| ***C11D 17/00*** | (2006.01) |

(52) U.S. Cl.

CPC .............. *C11D 1/83* (2013.01); *C11D 3/0073* (2013.01); *C11D 3/0094* (2013.01); *C11D 3/2079* (2013.01); *C11D 3/28* (2013.01); *C11D 3/32* (2013.01); *C11D 17/0043* (2013.01); *C11D 1/143* (2013.01); *C11D 1/721* (2013.01); *C11D 2111/16* (2024.01); *C11D 2111/18* (2024.01)

(58) Field of Classification Search

CPC .. C11D 1/12; C11D 1/14; C11D 1/665; C11D 1/72; C11D 1/83; C11D 3/2075; C11D 3/2079; C11D 3/2086; C11D 3/30

See application file for complete search history.

(56) References Cited

U.S. PATENT DOCUMENTS

| | | | | |
|---|---|---|---|---|
| 5,858,955 A | 1/1999 | Stringer et al. | | |
| 5,922,672 A | 7/1999 | Stringer et al. | | |
| 2010/0154823 A1* | 6/2010 | Cermenati | ............... | C11D 3/30<br>510/109 |
| 2018/0362887 A1* | 12/2018 | Motsenbocker | ......... | C11D 3/33 |

FOREIGN PATENT DOCUMENTS

| | | | | |
|---|---|---|---|---|
| CL | 2017000324 A1 | 8/2017 | | |
| EP | 2476481 A | 7/2012 | | |
| EP | 3418369 A1 | 12/2018 | | |
| GB | 2392167 A | 2/2004 | | |
| WO | 2014083082 A1 | 6/2014 | | |
| WO | WO-2019103887 A1 * | 5/2019 | ............... | C11D 1/06 |

OTHER PUBLICATIONS

FADEX H+ Safety Data Sheet; Menno Chemie-Vertrieg GMBH; prepared Apr. 2018; 10 pages (No English abstract).

"Menno Chemie-Vertrieb GmbH: FADEX H+ Reinigungsmittel-Konzentrat-FADEX H+—FiBL gelistetes Reinigungsmittel fur den okologischen Landbau"; Jan. 1, 2019, Gabot.de; https://www.gabot.de/ansicht/menno-chemie-vertrieb-gmbh-fadex-he-ein-reinigungsmittel-konzentrat-395198.html; 3 pages.

* cited by examiner

*Primary Examiner* — Brian P Mruk

(74) *Attorney, Agent, or Firm* — Dickinson Wright PLLC

(57) ABSTRACT

The present invention relates to the use of a carboxylic-acid-containing cleaning agent for removing stains of vegetable origin and/or for decontaminating surfaces contaminated by plant-protection agents. The agent comprises 20-60 wt. % of an aliphatic $C_1$-$C_{10}$ carboxylic acid, preferably formic acid, or a mixture of two or more of such aliphatic carboxylic acids which preferably comprises formic acid, at least one surfactant, preferably an anionic surfactant and/or at least one non-ionic surfactant, and water and/or solvent as the remainder. In another aspect, the present invention relates to specific carboxylic-acid-containing cleaning agents for hard surfaces, which agents are particularly suitable for the intended use.

18 Claims, No Drawings

LIQUID ACIDIC CLEANING AGENT COMPOSITIONS FOR HARD SURFACES

CROSS-REFERENCE TO RELATED APPLICATIONS

This application is a U.S. National Stage of International Application No. PCT/EP2020/074431, filed on Sep. 2, 2020, which claims the benefit and priority of European Patent Application No. 19200807.6, filed on Oct. 1, 2019, the entire contents of which are incorporated herein by reference.

The present invention relates to improved cleaning agent compositions which can be used in particular for cleaning hard surfaces. In particular, the invention relates to liquid acidic cleaning agent compositions for removal of plant contaminants and/or for the decontamination of surfaces, such as glass or metal surfaces in greenhouses or transport surfaces and/or storage surfaces, but also polystyrene trays.

The present invention relates very particularly preferably to a cleaning agent containing carboxylic acid, for example a cleaning agent containing formic acid, and to its use for removing contamination of vegetal origin and/or for decontaminating surfaces, in particular hard surfaces, which may also be contaminated, for example, with pesticides.

The cleaning agent composition according to the invention is very effective in its efficacy, but the use of highly water-polluting ingredients can be dispensed with, so that it can also be classified in water hazard class 1. In addition, the cleaning agent composition according to the invention is characterised by good biodegradability.

STATE OF THE ART

Cleaning agent compositions must fulfil numerous requirements. Ideally, they should not pose any serious hazards to humans or the environment, but they should also have a high and efficient cleaning effect and be easy to handle.

Various formulations for compositions of cleaning agent compositions have been prepared and are known in the prior art. For example, strong acid cleaning agent compositions containing strong acids, such as hydrochloric acid, are useful in removing hard water stains. However, the presence of strong acids is known to be an irritant to the skin and further offers the potential for toxicological hazards. Also, few detergents provide any sanitising effect on the hard surfaces being treated.

Contamination of vegetal origin differs significantly in composition from inorganic contamination and contamination of animal origin, and thus poses different challenges to the composition of the cleaning agent composition. Contamination of animal origin, which occurs for example in agricultural operations, includes urine and faeces. Dairy farms, for example, have a wide range of cleaning agent compositions available for their removal. Practice has shown that these cleaning agent compositions are only suitable to a limited extent for removing contamination of vegetal origin.

Such impurities of vegetal origin do not only include plant extracts or juices, which may result for example from damage to plant parts and fruits during harvesting, storage and packaging in the respective farms, they also include products with plant ingredients, such as shading paints for greenhouses. The shading paints on the market often contain starch. After their application to the glass surfaces of greenhouses, such starch-based paints are, if desired, either difficult to remove with the cleaning agent compositions available in the state of the art or the effective cleaning agent compositions are halogen-containing formulations and thus highly toxic and not very environmentally compatible.

In summary, it can be stated that so far known cleaning agent compositions and methods used are the manual removal of contamination with a brush and heated water or the use of poly- or perfluorinated surfactants in the cleaning agent compositions. Due to the lack of degradability, persistence, toxicity and bioaccumulation of fluorosurfactants, the production and use of this substance class will be banned within the EU area from July 2020.

Another group of contaminations that can occur in gardening or arable farms are contaminations with plant protection products, such as mitosis inhibitors, for example on soil, storage and transport surfaces. Also, for the decontamination of such surfaces or other objects, such as transport boxes and processing machines, the trade either provides products that are problematic because of their toxicity and poor environmental hazard, or that are not very effective in their cleaning performance.

In accordance with a first aspect, the invention is therefore based on the task of providing a cleaning agent composition, also referred to herein as a cleaning agent composition composition or agent, which is as universally applicable as possible for the removal of contamination of vegetal origin and/or for the decontamination of surfaces, and which does not present any serious health hazards for humans and the environment when used.

Furthermore, it is the task of the present invention to provide an efficient and safe method for removing contamination of vegetal origin and/or for decontaminating surfaces by using a suitable cleaning agent composition.

According to a further aspect, cleaning agent compositions are also to be provided which are ideally suited for cleaning and removing contamination caused by shading and which do not contain fluorosurfactants as an active ingredient.

These tasks are solved according to a first aspect of the present invention by providing a cleaning agent composition for hard surfaces, which has proven to be particularly advantageous for removing contamination of vegetal origin and/or for decontaminating surfaces contaminated with pesticides.

The cleaning agent composition according to the invention comprises at least 20 wt. % of an aliphatic carboxylic acid having 1 to 10 carbon atoms, in particular 20-60 wt. % of formic acid or at least 20 wt. % of a mixture of two or more such aliphatic carboxylic acids, the mixture comprising formic acid. Furthermore, the cleaning agent composition according to the invention comprises one or more surfactants. The surfactant or surfactants are preferably anionic surfactants or a mixture of two or more anionic surfactants and/or nonionic surfactants or a mixture of two or more nonionic surfactants.

The acidic cleaning agent composition for hard surfaces according to the invention preferably comprises the following components:

- 20-60 wt. % of an aliphatic carboxylic acid having 1 to 10 carbon atoms, said carboxylic acids being in particular selected from the group consisting of formic acid, acetic acid, propanoic acid, oxalic acid, malonic acid, citric acid and any mixtures thereof or a mixture of two or more such aliphatic carboxylic acids,
- 1-30 wt. % of an anionic surfactant, preferably an alkanesulfonic acid and/or an alkanesulfonate, or a mixture of two or more anionic surfactants, said mixture preferably comprising an alkanesulfonic acid and/or an alkanesulfonate, 0.1-5 wt. % of a nonionic surfactant, preferably a fatty alcohol ethoxylate, or a mixture of two or more nonionic surfactants, said mixture preferably comprising a fatty alcohol ethoxylate, and as the remainder water and/or solvent.

The agent according to the invention (hereinafter also referred to as cleaning agent composition or cleaning agent composition composition) is characterised by an advantageous effect in the removal of contamination of vegetal origin and/or for the decontamination of surfaces contaminated with pesticides. It is therefore used in particular for removing contamination of vegetal origin. Another application is the decontamination of surfaces contaminated with pesticides, for example.

The cleaning agent composition compositions according to the invention are characterised by high rates of removal of the contamination, for example of the incrustations from starch adhesions, at room temperature within 3 to 15 minutes, preferably within 3 to 5 minutes.

Compared to conventional cleaners, the cleaning agent composition compositions according to the invention lead to the desired success in a significantly shorter time. In this context, the literature "Soaps, Fats, Oils, Waxes, SÖFW 10, 2001, pp. 108-114" reports in detail on the type of cleaning solution as well as the temperature and time required to remove starch adhesions on glass surfaces. In contrast, the compositions according to the invention are characterised by a greatly improved effect. For example, very high removal rates of the incrustations at room temperature within 3 to 5 minutes were observed for starch adhesions.

The cleaning agent composition according to the invention is ideally suited for removing contamination of vegetal origin from hard surfaces and for decontaminating surfaces. Surfaces or surfaces to be decontaminated in the sense of the present invention are not only floor surfaces, floor coverings, glass surfaces, film surfaces, storage surfaces and transport surfaces, the term also includes—not exhaustively—objects such as boxes, transport and/or storage devices, for example polystyrene trays, irrigation mats and channels, ribbon fabrics, peeling-, cutting-, weighing and processing machines. Such surfaces or articles are examples of surfaces or articles with a hard surface. The surfaces in question are found, for example, in gardening, arable farms, greengrocers and plant and fruit processing plants.

The composition according to the invention comprises at least one aliphatic carboxylic acid. Carbonic acids are organic compounds which carry one or more carboxyl groups and thus have a more or less pronounced acidic character. Depending on the number of carboxyl groups contained, a distinction is made between monocarboxylic acids, dicarboxylic acids and tricarboxylic acids. In contrast to the cyclic and aromatic carboxylic acids, the carboxyl group(s) of the aliphatic carboxylic acids is/are bonded to an aliphatic rest R.

According to the invention, the aliphatic carboxylic acids are carboxylic acids with 1 to 10 carbon atoms. These comprise alkanoic acids, alkenoic acids and alkynoic acids. In alkanoic acids, the residue R is saturated. Alkenoic acids have at least one double bond in the residue and alkynoic acids have at least one triple bond in the residue. The aliphatic carboxylic acids which can be used according to the invention, i.e. which are included in the composition, may be a mono-, di- or tricarboxylic acid, wherein monocarboxylic acids are being preferred.

Particularly preferred aliphatic monocarboxylic acids according to the invention are formic acid, acetic acid, propionic acid or mixtures thereof. Examples of dicarboxylic acids include, but are not limited to, oxalic acid and malonic acid, and citric acid may be mentioned as an exemplary tricarboxylic acid.

The aliphatic carboxylic acids described above, for example the aliphatic monocarboxylic acids, may be included individually or in any mixture of such carboxylic acids in the cleaning agent composition according to the invention. Surprisingly, the one or more aliphatic carboxylic acid(s), in particular monocarboxylic acids, have been shown to be particularly effective on plant sugars and components such as chlorophyll.

The proportion of the aliphatic carboxylic acid or the mixture of aliphatic carboxylic acids in the composition according to the invention is up to 20 to 60 wt. %, preferably up to 25 to 58 wt. %, even more preferably 30 to 55 wt. %.

The cleaning agent composition according to the invention contains at least one anionic surfactant in combination with at least one nonionic surfactant. The combination of these two surfactant groups has proven to be particularly advantageous.

Anionic surfactants are surfactants that have a negatively charged functional group. Like all surfactants, anionic surfactants are also composed of a polar and a non-polar part. An alkyl residue can act as the non-polar part. The polar functional group can be, for example, a carboxylate group ($—COO^-$), a sulphonate group ($—SO_3^-$) or a sulphate group ($—SO_4^{2-}$).

In the case of anionic surfactants, alkanesulphonic acids and/or alkanesulphonates have proven to be particularly advantageous. Alkanesulphonates are the salts of alkanesulphonic acids. Sodium salts are particularly preferred according to the invention. Particularly preferred anionic surfactants according to the invention are therefore alkanesulphonic acids and/or alkanesulphonates, especially sodium alkanesulphonates. Even more preferred are alkanesulfonates with 10 to 20 carbon atoms, most preferably with 12 to 18 carbon atoms, or their salts, preferably their sodium salts.

The anionic surfactant or the anionic surfactant mixtures included in the composition according to the invention, in particular the alkanesulphonic acids, alkanesulphonates and/or any mixtures of alkanesulphonic acids and/or alkanesulphonates, are included in the compositions according to the invention in a proportion of 1 to 30 wt. %, in particular in a proportion of up to 4 to 28 wt. %, very preferably in a proportion of up 6 to 25 wt. %.

Even though non-ionic surfactants cannot dissociate in water, they are also compounds that have both hydrophilic (polar) and hydrophobic (apolar) structures in the molecule. Non-ionic surfactants are characterised by good washing performance and high dissolving power for plant contaminants, especially at lower temperatures.

Among the non-ionic surfactants, fatty alcohol ethoxylates have proven to be particularly advantageous. Fatty alcohol ethoxylates can be produced by the addition of ethylene oxide to natural and synthetic fatty alcohols. According to the invention, particularly preferred non-ionic surfactants are therefore fatty alcohol ethoxylates. According to the present invention, it is particularly preferred that the fatty alcohol ethoxylates used have been prepared from natural or synthetic fatty alcohols having up to 6 to 22 carbon atoms, preferably having 12 to 18 carbon atoms.

Suitable fatty alcohols comprise, for example, hexan-1-ol, octan-1-ol, decan-1-ol, lauryl alcohol, myristyl alcohol, cetyl alcohol, stearyl alcohol, eicosanol, behenyl alcohol, hexadecenol, oleyl alcohol, linoleyl alcohol, decyl alcohol, stearyl alcohol, or mixtures of $C_8$ to C22 chain cuts, such as coconut fatty alcohol and palm kernel oil alcohol, synthetic primary alcohols, such as iso-$C_{-13}$ oxo-alcohols, $C_{13}/C_{15}$ oxo-alcohols, mixtures of linear, single-branched or multi-branched oxo alcohols with an average carbon chain length of 10 to 15 carbon atoms, Ziegler alcohols with 8 to 22 carbon atoms and Guerbet alcohols with 10, 12, 14, 16 or 18 carbon atoms and linear and branched secondary alkanols with 8 to 22 carbon atoms. The alcohols can be saturated and unsaturated.

According to the invention, the ethoxylates preferably have a degree of ethoxylation (EO) in the range from 3 to 9, even more preferably in the range from 4 to 8 and most preferably in the range from 5 to 7. In the context of the present disclosure, for example, the indication EO 3 means that the fatty alcohol has been reacted with 3 moles of ethylene oxide.

The nonionic surfactant or the nonionic surfactant mixture comprised in the composition according to the invention, in particular one of the fatty alcohol ethoxylates described above or any mixture thereof, is comprised in the composition according to the invention in a proportion of from 0.1 to 5 wt. %, in particular in a proportion of up 0.5 to 5 wt. %, very preferably in a proportion of up 1 to 3 wt. %.

In one embodiment, the composition according to the invention may further comprise an aromatic carboxylic acid or a mixture of two or more aromatic carboxylic acids. The aromatic carboxylic acid is preferably benzoic acid. In the case that a mixture of aromatic carboxylic acids is comprised in the composition according to the invention, the mixture preferably comprises benzoic acid, in particular with a proportion of at least 30 wt. %, based on all aromatic carboxylic acids of this mixture. Benzoic acid is also characterized by a preservative property. The aromatic carboxylic acid, in particular benzoic acid, may also serve the purpose of inhibiting corrosion in low concentrations in an acidic environment, when a stronger acid almost completely represses the dissociation of the aromatic carboxylic acid, in particular benzoic acid.

The aromatic carboxylic acid or the mixture of aromatic carboxylic acids, for example the benzoic acid or a mixture containing benzoic acid, is preferably present in the composition according to the invention in a proportion of 0.3 to 3 wt. % by. Even more preferably, the optional amount of the one or more aromatic carboxylic acid is 0.4 to 2.8 wt. %, even more preferably 0.5 to 2.6 wt. %.

In another embodiment according to the invention, the cleaning agent according to the invention does not contain any aromatic carboxylic acid. Since any unavoidable impurities are to be disregarded here, the statement "no aromatic carboxylic acid" means that one or more aromatic carboxylic acid(s) with a total content, based on the cleaning agent composition, of from 0 wt. % to less than 0.01 wt. % are comprised in the cleaning agent composition. Preferably, the maximum allowable limit is 0.008 wt. %, more preferably 0.006 wt. % and even more preferably 0.004 wt. %, each based on the cleaning agent composition. Most preferably, the proportion of aromatic carboxylic acids in the composition is 0 wt. %.

The cleaning agent composition according to the invention further comprises water (as solvent) and/or at least one other solvent besides water. Preferably, the solvent is water or comprises water in a solvent mixture. Solvents other than water are known to the skilled person. In particular, they comprise alcohols, for example ethanol.

The proportion of the at least one solvent is the remainder to 100 wt. % (ad. 100 wt. %), based on the total composition of the cleaning agent composition according to the invention. That is to say, the proportions by weight of the essential and optional constituents, if any, of the—composition are always chosen so that the total is 100 wt. %.

The cleaning agent composition according to the invention is preferably a liquid acidic composition.

The cleaning agent composition according to the invention preferably has an acidic pH value in the range of 2 to 4.

According to a preferred embodiment, the composition according to the invention may also contain one or more foam boosters or foam boosters, preferably selected from the groupconsisting of amine oxides, in particular alkyl amine oxides.

The foam booster(s) is/are preferably comprised in the composition according to the invention in a proportion of 0.3 to 5 wt. %. Even more preferably, the proportion is 0.4 to 4 wt. %.

The alkyl amine oxides preferably contain alkyl residues with a chain length of 14 to 24 carbon atoms. According to the invention, a preferred foam booster is cocospropyl amine oxide or cocos fatty acid amidopropyldimethyl amine oxide or cocamido propyl amine oxide or cocos fatty acid amidopropyldimethyl ammonium oxide with different chain lengths (CAS No. 68155-09-9). In addition to the foam boosters explicitly mentioned above, other commercially available foam boosters known to the skilled person can be used.

The use of a foam booster is therefore advantageous because the foam that forms from the cleaning agent composition adheres well to the surface to be cleaned and thus leads to thorough cleaning. The combination of the above-mentioned surfactants, especially with a high proportion of the anionic surfactants, in combination with one or more foam boosters has surprisingly proven to be particularly advantageous.

Furthermore, it has surprisingly been found that with regard to the stability of the composition and/or the foam, as well as with regard to the cleaning effect, in particular a combination of the cocamidopropylamine oxide, preferably with a proportion in the range of 0.3 to 5 wt. %, with formic acid, preferably with a proportion of formic acid in the range of 20, even more preferably of 25 to 60 wt. %, in each case based on the composition according to the invention, provides particularly advantageous effects. Compositions with such a combination of ingredients, and the foam optionally obtained therefrom, are stable despite the acidic conditions. In particular, inactivation of the carboxylic acid(s) can be counteracted by, for example, complex formation.

According to a preferred embodiment of the cleaning agent composition according to the invention, the aliphatic carboxylic acid is formic acid, which is preferably included in the composition according to the invention in a proportion of from 20 to 60 wt. %, even more preferably in a proportion of from up to 25 to 58 wt. %, even more preferably in a proportion of up to 30 to 55 wt. %. In the case that the composition according to the invention comprises as aliphatic carboxylic acid component a mixture of two or more aliphatic carboxylic acids, the formic acid is preferably present in such a mixture. Even more preferably, the proportion of formic acid is at least 30 wt. %, preferably at least 40 wt. %, based on the sum of the proportions of aliphatic carboxylic acids having 1 to 10 carbon atoms in this mixture.

The use of formic acid is particularly advantageous because it has been surprisingly shown that formic acid, especially in the concentration of use according to the invention, has a very good and specific cleaning effect on, for example, plant mono-, di- and polysaccharides, but also on compounds of the plant secondary metabolism, such as pigments, including chlorophyll. Without wanting to be bound to this theory, it is the case that formic acid is the simplest and shortest-chain alkanoic acid, and the carboxyl group particularly strongly determines its property.

Further conventional additives and auxiliary substances for cleaning agent compositions can optionally be added to the agent according to the invention. Suitable substances and substance mixtures are well known to the skilled person and can be obtained commercially. The additives and auxiliary substances may be, for example, conventional formulation aids acceptable for the intended purpose, colourants and fragrances, buffer substances, structural substances, preservatives, etc.

If necessary, one or more substances serving to protect against corrosion may be added to the agent according to the invention. For the purposes of the present disclosure, corrosion protection means measures to prevent damage caused by corrosion to metallic components, but also to materials such as glass, plastics, building materials, etc. The protective measures taken are aimed in particular at reducing the speed of the corrosive attack. The protective measures taken are aimed in particular at reducing the speed of the corrosive attack to such an extent that damage to the component or material can be avoided during its service life or at least that the functionality of the component or material is not impaired. For further definition, reference is made to the standard DIN EN ISO 8044.

The corrosion protection agents suitable for this purpose are generally known to the skilled person and are commercially available. However, according to the invention, the corrosion protection agent benzotriazole is particularly preferred for preventing or reducing corrosion processes. Surprisingly, this has proven to be particularly advantageous in combination with the other essential and optional components of the cleaning agent composition according to the invention. According to the invention, benzotriazole can be included in the cleaning agent composition according to the invention either individually or in combination with other corrosion inhibitors and/or other additives and auxiliary agents.

The anti-corrosion agent(s) is/are preferably present in the composition according to the invention in a proportion of from 0.05 to 1 wt. %, more preferably from 0.1 to 0.8 wt. %, even more preferably from 0.15 to 0.6 wt. %. The corrosion inhibitor benzotriazole, which is particularly preferred according to the invention, is preferably present in a proportion of from 0.05 to 1 wt. %, even more preferably from 0.1 to 0.8 wt. %, even more preferably from 0.15 to 0.6 wt. %.

According to a preferred embodiment of the invention, the cleaning agent composition according to the invention is free of highly water-polluting ingredients. In this context, highly water-polluting ingredients means substances and mixtures which, according to their hazardousness, are to be classified in water hazard class 3 according to the requirements of the Ordinance on Installations for Handling Substances Hazardous to Water (AwSV) with the date of issue of 18 Apr. 2017. For the purposes of the present disclosure, the indication "free from" means that the proportion of such constituents in the total composition is 0 to less than 0.01 wt. %. Preferably, the maximum permissible limit is 0.008 wt. %, still more preferably 0.006 wt. % and still further preferably 0.004 wt. %, in each case based on the cleaning agent composition. Most preferably, the proportion of such constituents in the composition is 0 wt. %. Any unavoidable impurities are to be disregarded here.

The components of the cleaning agent composition according to the invention should therefore preferably be selected in such a way that at least a classification in water hazard class 2, and particularly preferably a classification in water hazard class 1, can be made. For the purposes of the present disclosure, water hazard classes 1, 2 and 3 are defined in accordance with the Ordinance on Installations for Handling Substances Hazardous to Water (AwSV), issued on 18 Apr. 2017.

Furthermore, it is preferred according to the invention that the components of the cleaning agent composition are to be selected in such a way that the agent is readily biodegradable.

According to a preferred embodiment, the agent/cleaning agent composition according to the invention comprises the following components:

25-55 wt. % of an aliphatic monocarboxylic acid, preferably formic acid, 0-3 wt. % of at least one aromatic carboxylic acid, preferably benzoic acid, 1-30 wt. % of an alkyl sulphonate having 12 up to 18 carbon atoms or its sodium salt, 0.5-5 wt. % of a fatty alcohol ethoxylate, said fatty alcohol having from 15 to 30 carbon atoms, preferably with a degree of ethoxylation ranging from EO 3 to 9, 0-5 wt. %, preferably 0.3-5 wt. % of at least one amine oxide, preferably cocamidopropyl amine oxide, 0-1 wt. % of a corrosion inhibitor, preferably benzotriazole, and ad 100 wt. % water and/or another solvent.

In addition to the ingredients mentioned for this preferred embodiment of the agent according to the invention, such a cleaning agent composition may optionally contain one or more customary additives and auxiliary agents.

Also included within the scope of the present invention are those compositions or agents which, with the exception of common impurities, consist only of the above-mentioned essential components, and optionally one or more of the optional components.

According to another preferred embodiment, the agent/cleaning agent composition according to the invention comprises the following components:

24-45 wt. % of an aliphatic monocarboxylic acid other than propionic acid, preferably formic acid, 1-15 wt. % propionic acid, 1-3 wt. % of at least one aromatic carboxylic acid, preferably benzoic acid, 1-25 wt. % of an alkyl sulphonate containing 12 to 18 carbon atoms or its sodium salt, 0.5-5 wt. % of a fatty alcohol ethoxylate wherein the fatty alcohol has from 15 to 30 carbon atoms, preferably with a degree of ethoxylation in the range of EO 3 to 9, 0-5 wt. % preferably 0.3-5 wt. % of at least one amine oxide, preferably cocamidopropyl amine oxide, 0-1 wt. % of a corrosion inhibitor, preferably benzotriazole, and ad 100 wt. % water and/or another solvent.

In addition to the ingredients mentioned for this preferred embodiment of the agent according to the invention, such a cleaning agent composition may optionally contain one or more customary additives and auxiliary agents.

Also included within the scope of the present invention are those compositions or agents which, with the exception of common impurities, consist only of the above-mentioned essential components, and optionally one or more of the optional components.

The agent according to the invention is a liquid one-component product from which a diluted working solution can be prepared, which then contains 0.5 up to 5 wt. %, in particular 0.8 to 2.2 wt. % of the agent. According to a further aspect, the present application therefore also relates to the diluted working solution explained above. The dilution of the agent to the working solution is preferably carried out with water.

Another aspect of the present invention relates to the use of a carboxylic acid-containing cleaning agent for removing contamination of vegetal origin and/or for decontaminating surfaces contaminated, for example, with pesticides. The cleaning agent composition used according to the invention comprises at least 20 wt. % of an aliphatic carboxylic acid having 1 to 10 carbon atoms, or at least 20 wt. % of a mixture of two or more such aliphatic carboxylic acids. In addition, the cleaning agent composition used according to the invention comprises one or more surfactants. The surfactant or surfactants are preferably anionic surfactants or a mixture of two or more anionic surfactants and/or nonionic surfactants or a mixture of two or more nonionic surfactants.

The cleaning agent composition used according to the invention preferably comprises

- 20-60 wt. % of an aliphatic carboxylic acid having 1 to 10 carbon atoms, or mixture of two or more such aliphatic carboxylic acids, which preferably comprises formic acid or wherein the mixture preferably comprises formic acid,
- at least one surfactant, wherein the at least one surfactant is preferably an anionic surfactant or a mixture of two or more anionic surfactants, preferably with a proportion of the one or more anionic surfactant(s) of no more than 30 wt. %, and/or a nonionic surfactant or a mixture of two or more nonionic surfactants, preferably with a proportion of the one or more nonionic surfactant(s) of no more than 5 wt. %, and
- as the remainder water and/or solvent.

The use of such an agent enables gentle but effective removal of plant contamination and/or decontamination of surfaces.

As already explained in connection with the composition as such, the aliphatic carboxylic acids according to the invention are carboxylic acids with 1 to 10 carbon atoms. These include both alkanoic acids, alkenoic acids and alkynoic acids. The aliphatic carboxylic acids which can be used according to the invention may be a mono-, di- or tricarboxylic acid, monocarboxylic acids being preferred. Particularly preferred aliphatic carboxylic acids according to the invention are formic acid, acetic acid, proprionic acid. Such carboxylic acids may be included individually or in any mixture of such carboxylic acids, in particular of monocarboxylic acids, in the cleaning agent composition according to the invention or in the cleaning agent composition used according to the invention.

The proportion of the aliphatic carboxylic acid or the mixture of aliphatic carboxylic acids in the composition according to the invention is 20 up to 60 wt. %, preferably 25 to 58 wt. %, more preferably from 30 to 55 wt. %.

In a particularly preferred embodiment, the aliphatic carboxylic acid is formic acid. That is, the agent used comprises formic acid as the aliphatic carboxylic acid. In the case that the agents used comprises several aliphatic carboxylic acids, it is preferred that the proportion of formic acid in the aliphatic carboxylic acid component is at least 30 wt. %.

The agent used according to the invention comprises at least one surfactant or a surfactant mixture, preferably in a proportion of 1 to 30 wt. %. Further preferably, the agent used according to the invention comprises at least one anionic surfactant and/or at least one nonionic surfactant. The proportion of the anionic surfactant or the anionic surfactants in the agent used is preferably not more than 30 wt. %, still more preferably the proportion is from 1 to 30 wt. %, in particular from 4 to 28 wt. %, very particularly preferably from 6 to 25 wt. %. The proportion of the nonionic surfactant or the nonionic surfactants in the agent used is preferably not more than 5 wt. %, still more preferably 0.1 to 5 wt. %, in particular 0.5 to 4 wt. %, very particularly preferably 1 to 3 wt. %. With regard to the surfactant system, a combination of one or more anionic surfactants with one or more non-ionic surfactants is particularly advantageous for the reasons already described above.

In the case of such a combination, the proportion of the one or more anionic surfactant(s), based on the total composition of the agent, is preferably 1 up to 30 wt. %, even more preferably 4 up to 28 wt. %, and the proportion of the one or more nonionic surfactant(s), based on the total composition of the agent, is preferably 0.1 up to 5 wt. %, even more preferably 0.5 up to 4 wt. %.

In principle, all anionic surfactants known to the skilled person for use in cleaning agent compositions and any mixtures thereof can be used. Surprisingly, however, it has been found that alkane sulphonates and/or their salts, in particular their sodium salts, are preferred as anionic surfactants. With regard to still further preferred embodiments for these anionic surfactants, reference is made to the above explanations. Also with regard to the non-ionic surfactant, in principle all non-ionic surfactants known to the skilled person for use in cleaning agent compositions and any mixtures thereof can be used. Surprisingly, however, it has been found that fatty alcohol ethoxylates, in particular those with a degree of ethoxylation (EO) in the range from 3 to 9, are preferred as the nonionic surfactant. With regard to still further preferred embodiments for these non-ionic surfactants, reference is made to the above explanations.

The cleaning agent composition used according to the invention further comprises water (as a solvent) and/or at least one other solvent besides water. Preferably, the solvent is water or comprises water in a solvent mixture. Solvents other than water are known to the skilled person. In particular, they comprise alcohols, such as ethanol.

The proportion of the at least one solvent is the remainder to 100 wt. % (ad. 100 wt. %), based on the total composition of the cleaning agent composition according to the invention. That is to say, the proportions by weight of the essential and optional constituents, if any, of the—composition are always chosen so that the total is 100 wt. %.

The cleaning agent composition used according to the invention preferably has an acidic pH value, even more preferably a pH value in the range of 2 to 4.

The cleaning agent composition used according to the invention is preferably a liquid composition.

The composition used according to the invention may optionally further contain at least one aromatic carboxylic acid, preferably benzoic acid, and/or an anticorrosive agent, preferably benzotrialzole, and/or further auxiliaries and/or additives known to the person skilled in the art for cleaning agent compositions. With regard to preferred proportions of these optional ingredients, reference is made to the above disclosure concerning the composition as such.

These proportions apply accordingly.

According to a preferred embodiment of the use according to the invention, the cleaning agent composition used is one of the cleaning agent compositions for a hard surface described above according to the first aspect of the invention. Reference is made to the corresponding disclosure concerning the individual ingredients and their proportions, also with respect to particularly preferred embodiments.

According to a preferred form of use in accordance with the invention, the contamination to be removed is a starch-containing contamination or deposit.

The polysaccharide starch is the most important reserve substance in plant cells. Animal organisms and fungi make use of a different carbohydrate store. This polysaccharide is one of the reasons why contamination of vegetal origin differs significantly from contamination or deposits of animal origin. The effective removal of starch poses special challenges for the cleaning agent composition to be used. Surprisingly, cleaning agents containing carboxylic acid have shown themselves to be particularly preferred for the removal of starch-containing contamination or deposits.

A predominant number of the shading paints on the market for the glass surfaces of greenhouses are starch-based. Therefore, in one embodiment of the invention, the use according to the invention relates to the use of one of the above-described cleaning agents containing carboxylic acid for removing shading paint, in particular from glass surfaces of greenhouses. Until now, halogen-containing formulations have been used for this purpose, which are highly toxic and not very environmentally friendly. Surprisingly, the cleaning agent compositions containing carbonic acid described in this paper are at least as effective, but they are much less toxic and thus easier to handle. They are also characterised by a significantly better environmental compatibility. It has been shown in particular that incrustations of starch adhesions can be removed at room temperature within 3 to 15 minutes, preferably within 3 to 5 minutes. These high detachment speeds of the incrustations at room temperature are surprising and advantageous.

According to the invention, the impurities of vegetal origin to be removed can also be, or in addition to the starch-containing impurities, plant juices/extracts containing sugar and/or amino acids, in particular juices/extracts of tomato, pepper and/or cucumber.

Such juices or extracts are produced, for example, during the harvesting, packaging, storage or processing of plant products, especially tomatoes, peppers and/or cucumbers, in garden centers or by traders. These contaminants are difficult to remove from the soiled surfaces or objects due to their chemical composition. Surprisingly, it has been shown that a carboxylic acid-containing cleaning agent as described above, and in particular a carboxylic acid-containing cleaning agent according to the first aspect of the present invention, is also particularly suitable for effectively and gently removing such contaminants. Furthermore, aspects relating to food law and/or the protection of employees can be taken into account by using the agent. According to a further embodiment of the use according to the present invention, the cleaning agent containing carboxylic acid is thus used for removing plant juices/extracts containing sugars and/or amino acids, in particular for removing juices/extracts of tomato, pepper and/or cucumber.

The group of soils of vegetal origin that are problematic in terms of their removal also includes soils or deposits containing chlorophyll and/or a coloured component. Such deposits can be green coatings, for example algae coatings.

Chlorophylls are natural pigments formed by organisms that carry out photosynthesis. They are thus present in all green parts of plants. The term “coloured components” as used in the context of the present invention means or includes other photosynthetic pigments and coloured secondary plant ingredients.

Surprisingly, it has been shown that a cleaning agent containing carboxylic acid as described above, and in particular a cleaning agent containing carboxylic acid according to the first aspect of the present invention, is also particularly suitable for removing such contaminants effectively and gently. Furthermore, aspects relating to food law and/or the protection of employees can be taken into account by using the agent. According to a further embodiment of the use according to the present invention, the cleaning agent containing carboxylic acid is thus used for removing contaminants or deposits containing chlorophyll and/or another coloured component, in particular for removing deposits of green coatings, for example algae coatings.

However, the use of a carboxylic acid-containing cleaning agent according to the invention also comprises the use of a carboxylic acid-containing cleaning agent as described above, and in particular a carboxylic acid-containing cleaning agent according to the first aspect of the present invention, for decontaminating surfaces contaminated with pesticides. In particular, the pesticides are chlorpropham [(3-chlorophenyl)carbamic acid 1-methylethylester] and/or maleic hydrazide. Chlorpropham is a herbicide that is widely used in agriculture. It degrades only slowly or at a moderate rate in water or soil. Maleic hydrazide is also an active ingredient that is used extensively in crop production. The residues left on the plant parts or washed off plant protection product can/could lead to contamination of areas that need to be decontaminated. Such contamination can be a significant problem for, for example, producing and distributing farms. Surprisingly, it has been shown that a carboxylic acid-containing cleaning agent as described above, and in particular a carboxylic acid-containing cleaning agent according to the first aspect of the present invention, is also particularly suitable for removing such contamination. In addition, the use of the agent can take into account aspects relating to food law and/or the protection of employees.

According to one embodiment of the use according to the invention, the surface to be cleaned is preferably a surface selected from the group consisting of boxes, storage surfaces, transport surfaces, storage and/or transport devices, floor coverings, irrigation mats and/or channels, glass surfaces, foil surfaces, ribbon fabrics, peeling, cutting, weighing and processing machines.

According to a further embodiment of the use according to the invention, the surface to be cleaned is a greenhouse surface, in particular a glass, plastic or metal surface in a greenhouse.

In the application according to the present invention, the agent is applied either directly as a liquid, preferably as a dilute, preferably aqueous, solution, or as a foam or as a strongly foaming liquid. The cleaning agent composition, in particular the cleaning agent composition according to the first aspect of the present invention, can be applied according to the first variant as an aqueous solution to the objects or surfaces to be cleaned. Foaming may be subsequently induced by a mechanical action. It should be clarified here again that foam formation is not essential for the effect of the agent. This means that the effect according to the invention can in principle also be achieved without foam formation.

If the agent according to the invention is applied to the surfaces or objects as a foam or a highly foaming liquid according to the second preferred variant, this can be done, for example, by means of a commercially available foam sprayer. Corresponding devices are well known to the skilled person. In particular, a device as disclosed in European Patent No. 2 476 481 can be used to produce the foam.

For both application variants, the exposure time of the agent according to the invention to the surface or object to be cleaned is preferably at least 10 seconds, preferably at least 20 seconds, even more preferably at least 30 seconds and very particularly preferably at least 40 seconds. Furthermore, it is preferred that the maximum exposure time of the agent according to the invention on the surface or the object is 30 minutes, preferably 20 minutes, 10 minutes or 8 minutes, still more preferably 6 minutes and very particularly preferably a maximum of 4 minutes. The high compatibility of the agent according to the invention already mentioned above has proved to be particularly advantageous here and makes the long exposure times possible. After the exposure time, the agent or foam is preferably at least partially washed off or otherwise removed from the surface or object. Of course, several successive cleanings of the same surface or the same object are also possible as required and are included in the scope of the present invention.

According to a preferred embodiment of the use according to the invention, the carboxylic acid-containing cleaning agent composition, and in particular the carboxylic acid-containing cleaning agent composition according to the first aspect of the present invention, is diluted before use. The agent may be diluted with water or another suitable solvent. Suitable solvents are known to those skilled in the art. The application concentration of the cleaning agent composition is preferably 0.5 to 5%, preferably 0.8 to 2.2%, based on the cleaning agent composition.

The pH value of the diluted, ready-to-use cleaning agent composition is preferably in the range of 2 to 4.

In another aspect, the present invention also provides a method for removing soils of vegetal origin and/or decontaminating surfaces, the method comprising the steps of:

- Providing a carboxylic acid-containing cleaning agent composition comprising 2-60 wt. % of an aliphatic carboxylic acid having from 1 to 10 carbon atoms, preferably formic acid, or a mixture of two or more such aliphatic carboxylic acids, preferably comprising formic acid, at least one surfactant and the balance water and/or solvent. The at least one surfactant is preferably an anionic surfactant or a mixture of two or more anionic surfactants, preferably with a proportion of the one or more anionic surfactant(s) of no more than 30 wt. %, and/or a nonionic surfactant or a mixture of two or more nonionic surfactants, preferably with a proportion of the one or more nonionic surfactant(s) of no more than 5 wt. %.
- applying the provided carboxylic acid-containing cleaning agent composition to a surface contaminated with contamination of vegetal origin and/or a surface contaminated with pesticides, and
- Cleaning the surface.

According to a preferred embodiment of the process according to the invention, the application of the cleaning agent composition in the process according to the invention is carried out either directly as a liquid, preferably as an aqueous solution, or as a foam or as a strongly foaming liquid. According to the first variant, the cleaning agent composition can be applied as an aqueous solution. Foam formation can be subsequently triggered by a mechanical action. It should be clarified here again that foam formation is not essential for the effect of the composition. This means that the effect according to the invention can in principle also be achieved without foam formation.

If the agent according to the second preferred variant is applied as a foam or highly foaming liquid, this can be done, for example, by means of a commercially available foam syringe. Corresponding devices are well known to the person skilled in the art. In particular, a device as disclosed in European Patent No. 2 476 481 can be used to produce the foam.

With regard to the exposure time of the cleaning agent composition on the surface to be cleaned, reference is made—for both forms of application—to the corresponding explanations in connection with the use according to the invention. The times apply equally to the use according to the invention and the process according to the invention.

After the exposure time, the agent or foam is preferably at least partially washed off or otherwise removed from the surface or object. Of course, several successive cleanings are also possible as required and are included in the scope of the present invention. The method according to the invention may thus comprise the further steps of allowing the applied composition to act, preferably with the aforementioned exposure times, and/or the step of washing off or otherwise removing the applied composition, optionally after application time.

According to the invention, it is also provided that the cleaning agent composition is diluted to a desired application concentration in an upstream process step prior to its application as a solution, foam or strongly foaming solution. The dilution of the composition may be carried out with water or another suitable solvent. Suitable solvents are known to the skilled person. The application concentration of the cleaning agent composition is then preferably 0.5 to 5 wt. %, in particular 0.8 to 2,2 wt. % of the original composition. The dilution of the composition to the use solution is preferably carried out with water. The method according to the invention may thus comprise the further step, upstream the application, of diluting the composition to be applied, preferably to the above-mentioned application concentrations.

In a preferred embodiment, the method according to the invention thus comprises the steps of

- Providing a cleaning agent composition composed as described above,
- optionally diluting the prepared cleaning agent composition to an application concentration of preferably 0.5 to 5 wt. %, preferably with water and/or another suitable solvent,
- Application of the cleaning agent composition, diluted if necessary, to a surface to be treated,
- allowing the applied cleaning agent composition to act, preferably for a period of 10 seconds to 30 minutes, and
- Washing off or removing the applied cleaning agent composition.

With regard to preferred embodiments of the cleaning agent composition used in the process according to the invention, reference is made to the foregoing and reference is made thereto. In particular, in such a process the cleaning agent composition according to the first aspect of the invention is used.

Preferably, the surface to be cleaned contains a starchy contamination or deposit, which is even more preferably a contamination caused by a shading paint for the glass surfaces of greenhouses. In a preferred embodiment, therefore, a method is provided for removing a starchy contamination or deposit, in particular a shading paint, for example, from the glass surfaces of a greenhouse.

Surprisingly, it has been shown that a carboxylic acid-containing cleaning agent as described above, and in particular a carboxylic acid-containing cleaning agent composition according to the first aspect of the present invention, is also particularly suitable for effectively and gently removing starch adhesions on surfaces such as glass, metal or plastics. According to a further embodiment of the method according to the invention, the carboxylic acid-containing cleaning agent is thus appropriately used for removing starch adhesion on surfaces, in particular glass, metal and/or plastic surfaces, in the cleaning method according to the invention.

In a further preferred embodiment, a method for removing plant juices/extracts containing sugars and/or amino acids, in particular juices or extracts of tomato, pepper and/or cucumber, is provided. A still further embodiment is a method for removing chlorophyll-containing contaminants or deposits, in particular for removing deposited green coatings, for example an algae coating. A further embodiment according to the invention provides a method for decontaminating surfaces contaminated with pesticides, in particular with chloropropam [(3-chlorophenyl)-carbamic acid-1-methylethylester] and/or maleic acid hydrazide.

With regard to further details concerning the surfaces to be cleaned, reference is made to the corresponding explanations in connection with the use according to the invention. This disclosure applies both to the use according to the invention and to the method according to the invention.

The following examples illustrate the invention without, however, limiting it thereto; all designations are in wt. % unless otherwise indicated.

EXAMPLES

Example 1

Cleaning Agent Containing Carboxylic Acid (According to the Invention)

| Components | Parts by weight (wt./wt.) |
|---|---|
| C12-C18 alkanesulphonate sodium | 10.00 |
| C15-C20-Fettalkoholethoxylat-[3EO] | 2.00 |
| Formic acid | 30.00 |
| Benzotriazole | 0.30 |
| Water | ad 100.00 |

Example 2

Cleaning Agent Containing Carboxylic Acid (According to the Invention)

| Components | Parts by weight (wt./wt. ) |
|---|---|
| C12-C18 alkanesulphonate sodium | 20.00 |
| C15-C30-Fettalkoholethoxylat-[7EO] | 2.50 |
| Formic acid | 25.00 |
| Propionic acid | 10.00 |
| Benzoic acid | 2.00 |
| Water | ad 100.00 |

Example 3

Cleaning Agent Containing Carboxylic Acid (According to the Invention)

| Components | Parts by weight (wt./wt.) |
|---|---|
| C12-C18 alkanesulphonate sodium | 20.00 |
| Coconut fatty acid amidopropyldimethylammonium oxide | 3.00 |
| Formic acid | 50.00 |
| Water | ad 100.00 |

Example 4

Cleaning Agent Containing Carboxylic Acid (According to the Invention)

| Components | Parts by weight (wt./wt.) |
|---|---|
| C12-C18 alkanesulphonate sodium | 20.00 |
| C15-C20-Fettalkoholethoxylat-[3EO] | 1.00 |
| Coconut fatty acid amidopropyldimethylammonium oxide | 3.00 |
| Formic acid | 50.00 |
| Water | ad 100.00 |

In the preparation of example formulations 1 to 4, the water, preferably purified water, is first introduced and one or more carboxylic acids are dissolved in it. This solution is provided with components, surfactants and, if present, the benzotriazole and/or the foam booster are then added to this solution, and possibly further water to 100 wt. % is added and stirred. The result is a clear, strongly foaming liquid.

The example formulations described above, which are each a liquid one-component product, are each diluted to an aqueous, diluted working solution containing 1.5% of the agent and then applied by means of a foam sprayer and allowed to act briefly on the surfaces to be cleaned.

It has been shown that the exemplary cleaning agent compositions according to the invention could effectively and gently remove a starch-based shading paint from a glass surface at room temperature and an application time of 4 minutes.

Comparable positive results were achieved in the removal of plant juices from soiled transport boxes. Here, too, the cleaning was very effective and gentle.

What is claimed is:

1. A liquid acidic cleaning agent composition for hard surfaces, wherein the cleaning agent composition comprises:
20-60 wt. % of formic acid,
1-30 wt. % of C12-C18 alkanesulfonate sodium,
0.1-5 wt. % of a C13-C30 fatty alcohol ethoxylate having a degree of ethoxylation ranging from EO 3 to 9, and
water and/or solvent.

2. The cleaning agent composition according to claim 1, comprising 6-25 wt. % of the C12-C18 alkanesulfonate sodium and 1-3 wt. % of the fatty alcohol ethoxylate.

3. The cleaning agent composition according to claim 1, further comprising 0.3-3 wt. % of an aromatic carboxylic acid, or 0.3-3 wt. % of a mixture of two or more aromatic carboxylic acids.

4. The cleaning agent composition according to claim 3, wherein the aromatic carboxylic acid is benzoic acid, or the mixture comprises benzoic acid.

5. The cleaning agent composition according to claim 1, further comprising one or more foam boosters.

6. The cleaning agent composition according to claim 5, wherein the at least one foam booster is from the group of alkyl amine oxides.

7. The cleaning agent composition according to claim 5, wherein the one or more foam boosters is/are present with a proportion of 0.3-5 wt. %.

8. The cleaning agent composition according to claim 1, wherein the cleaning agent is readily biodegradable, and/or the cleaning agent has a pH in the range of from 2 to 4.

9. A method for the removal of contamination of vegetal origin and/or for the decontamination of contaminated surfaces, the method comprising:

applying a carboxylic acid containing liquid acidic cleaning agent composition on the contaminated surface; and at least partially wash off or otherwise remove the cleaning agent from the surface, wherein the cleaning agent comprises:

20-60 wt. % of formic acid, 1-30 wt. % of C12-C18 alkanesulfonate sodium, 0.1-5 wt. % of a C13-C30 fatty alcohol ethoxylate having a degree of ethoxylation ranging from EO 3 to 9, and water and/or solvent.

10. The method according to claim 9, wherein the contamination is selected from the group consisting of a starchy contamination or deposit, a shading paint for glass surfaces of greenhouses, plant juices/extracts containing sugars and/or amino acids, a chlorophyll containing contaminant or deposit, and a pesticide.

11. The method according to claim 10, wherein the contamination is a starchy contamination or a deposit, and the contaminated surface is a glass or metal surface.

12. The method according to claim 10, wherein the contamination is the plant juices/extracts, and the juices/extracts are of tomato, pepper and/or cucumber.

13. The method according to claim 10, wherein the contamination is a chlorophyll containing deposit, and the deposit to be removed is an algae covering.

14. The method according to claim 10, wherein the contamination is the pesticide, and the pesticide is chlorpropham [(3-chlorophenyl) carbamic acid 1-methyl ethyl ester] and/or maleic acid hydrazide.

15. The method according to claim 10, wherein the surface to be cleaned or decontaminated is selected from the group consisting of storage surfaces, transport surfaces, floor surfaces, floor coverings, glass surfaces, foil surfaces, boxes, transport devices, storage devices, irrigation mats, irrigation channels, ribbon fabrics, peeling machines, cutting machines, weighing machines and processing machines.

16. The method according to claim 10, wherein the cleaning agent composition is applied as a dilute aqueous solution or as a foam.

17. The method according to claim 16, wherein the diluted aqueous solution contains 0.5 to 5 wt. %, based on the cleaning agent composition.

18. The cleaning agent composition according to claim 1, further comprising 0.05 to 1 wt % of an anti-corrosion agent.

* * * * *